Figure 2:
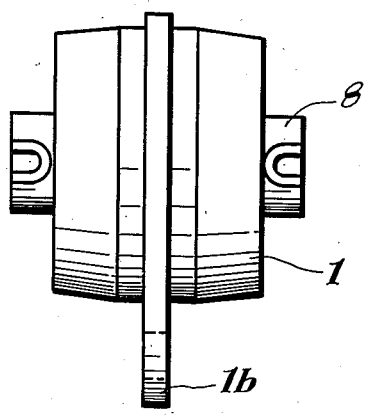

March 11, 1952    R. H. CUBITT ET AL    2,588,806
ALTERNATING CURRENT RECTIFIER OF
THE DRY SURFACE CONTACT TYPE
Filed Feb. 28, 1948    2 SHEETS—SHEET 1

INVENTORS
Roger Harry Cubitt and
Richard Geoffrey Sell.
BY

THEIR ATTORNEY

March 11, 1952
R. H. CUBITT ET AL
ALTERNATING CURRENT RECTIFIER OF
THE DRY SURFACE CONTACT TYPE
2,588,806
Filed Feb. 28, 1948
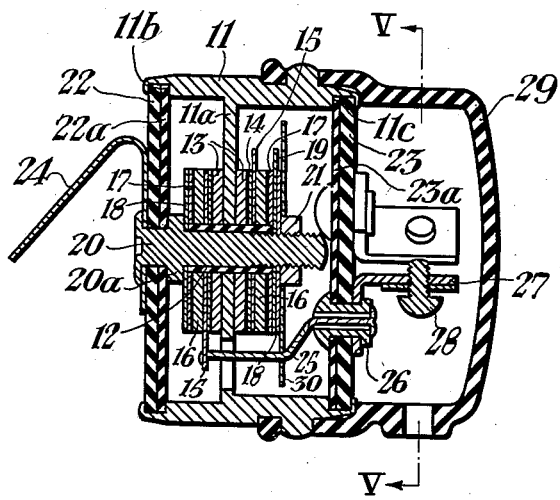
*Fig. 6.*
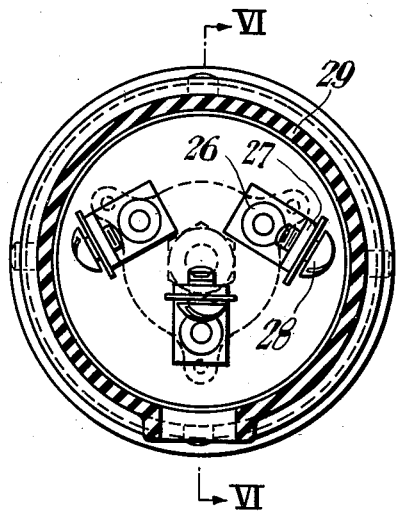
*Fig. 5.*
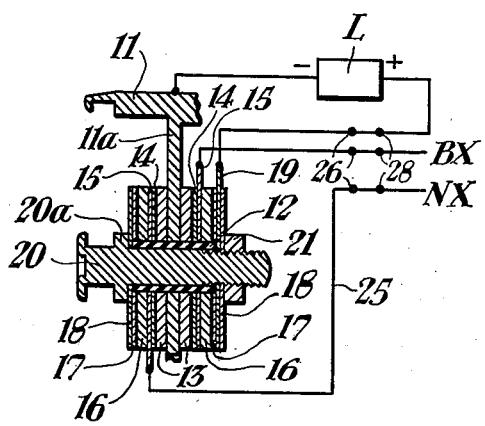
*Fig. 7.*
INVENTORS
Roger Harry Cubitt and
Richard Geoffrey Sell.
BY
THEIR ATTORNEY Patented Mar. 11, 1952

2,588,806

UNITED STATES PATENT OFFICE 2,588,806

ALTERNATING CURRENT RECTIFIER OF THE DRY SURFACE CONTACT TYPE

Roger Harry Cubitt and Richard Geoffrey Sell, London, England, assignors, by mesne assignments, to Westinghouse Air Brake Company, a corporation of Pennsylvania Application February 28, 1948, Serial No. 12,008
In Great Britain March 20, 1947

9 Claims. (Cl. 175—366)

This invention relates to alternating current rectifiers of the dry surface contact type and has for its object to provide an assembly of rectifier elements of this type in which the elements are effectively protected both from the atmosphere and mechanical damage while being provided with adequate cooling.

Known assemblies of rectifier elements of this type usually comprise a number of elements, together with spacer washers and cooling fins, mounted in a stack or column and held together by a bolt or the like passing through central apertures provided in the elements for that purpose, the assembly being usually protected from the atmosphere by a coating of paint or varnish.

Such assemblies suffer from several disadvantages when used in exposed positions and for purposes which are liable to result in mechanical damage, when used, for example, in connection with the lighting equipment of bicycles. Examples of such disadvantages are the liability to the ingress of moisture through faulty points in the protective coat of varnish, the penetration of the paint or varnish between the various units of the assembly and the difficulty of providing adequate cooling if the assembly is encased in some form of housing to protect it from mechanical damage.

In the assembly carried out according to the invention these disadvantages are overcome by mounting the rectifier elements within a hollow metal casing member provided with a central rib or partition to which the rectifier elements are clamped, so that the casing forms one terminal of the assembly and also serves to carry away the heat generated within the assembly, the two ends of the casing member being sealed by insulating discs or plates through which the other terminal connections extend.

In one form of a rectifier assembly constructed according to the invention there is provided a tubular metal body which has an integral center partition with a central hole through which is passed an insulating tube or bush somewhat shorter in length than the body itself. Threaded on the insulating tube, one either side or the center partition and in intimate contact therewith, are two rectifier elements. Fitting over each end of the insulating tube and coaxial therewith is a flanged contact member, a metal spacer and a spring washer being interposed between the flange of each contact member and the associated rectifier element. Abutting against shoulders formed upon the inside of the metal body and fitting closely over coaxial extensions of the contact members are insulating discs which effectively seal the ends of the body the outer rims of which are spun over to hold the insulating discs firmly in position. The coaxial extensions of the contact members may be suitably drilled and tapped to take terminal screws for the purpose of making external connections. The body may be provided with an extending lug for the purpose of mounting the assembly in the desired position and also for the purpose of earthing the assembly. There is thus provided a totally enclosed center tapped rectifier assembly, the two contact members forming the alternating current terminals and the metal body the direct current terminal which may be earthed. The rectifier elements being held in intimate contact with the metal body the latter dissipates the heat generated, being made of suitable proportions for this purpose, and the rectifier elements are effectively protected from mechanical damage and from the effects of the atmosphere.

In an alternative construction, adapted to provide a bridge connected rectifier assembly, two rectifier elements are mounted, in a manner similar to that described above, one either side of and in intimate contact with the center partition of the body, a further two rectifier elements being provided. In this form of construction a shouldered bolt passes through the insulating tube, the rectifier elements and the necessary spacers and washers being clamped together and to the center partition of the metal body between the shoulder of the bolt and a suitable nut. At one end of the assembly the head of the bolt projects through the insulating disc, which seals that end of the assembly, and forms a positive direct current terminal of the assembly. As in the previously described embodiment, the metal body forms one direct current terminal, which may be earthed, and the alternating current connections are made by means of wires attached to suitable connector plates mounted between each pair of rectifier elements and brought out to terminal tags carried by the insulating disc which seals the other end of the assembly. If desired a suitable rubber cap may be fitted over one or both ends of the assembly for the purpose of protecting the terminal connections.

We shall describe two forms of apparatus embodying our invention, and shall then point out the novel features thereof in claims.

Figure 1:
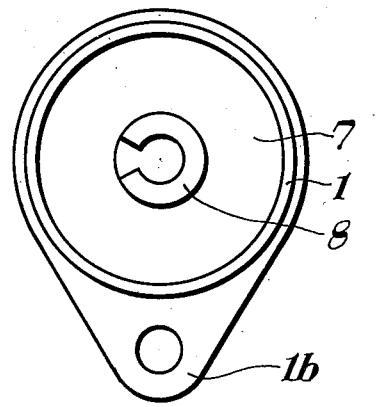
Figure 3:
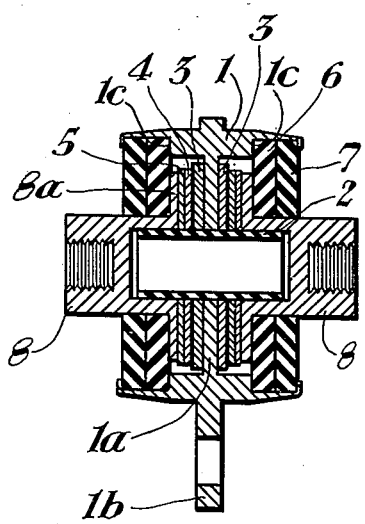
Figure 4:
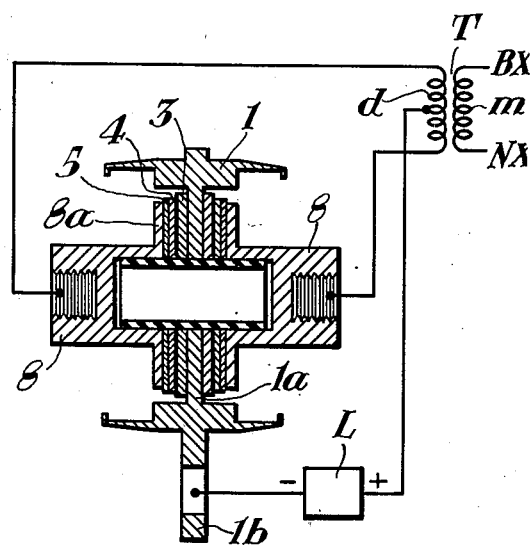

In the accompanying drawings, Fig. 1 is a front view, Fig. 2 is a side view, and Fig. 3 is a side cross section view showing one form of rectifier assembly embodying our invention; Fig. 4 shows a diagram of a circuit in which a rectifier having this form of assembly is used; Fig. 5 is an end section view, and Fig. 6 is a side cross section view showing a second form of rectifier assembly embodying our invention; and Fig. 7 shows a diagram of a circuit in which a rectifier having this second form of assembly is used.

Similar reference characters refer to similar parts in each of the views.

Referring first to Figs. 1, 2 and 3, a hollow metal casing 1 is shown, tubular in shape, a portion of which projects inwardly to form a transverse partition 1a. Another portion of casing 1 projects outwardly to form a lug 1b which may be used for mounting the assembly and for making an electrical connection to the casing.

An insulating tube 2 is mounted in a central opening in partition 1a of casing 1.

A flanged contact member 8 is fitted over each end of tube 2 in coaxial relation with it.

Two rectifier elements 3 are mounted on tube 2, one on either side of partition 1a. A metallic spacer element 4 is mounted next to the other side of each of the rectifier elements 3. A spring washer 5 is mounted between each of the spacers 4 and flange 8a of the adjacent contact member 8.

Two insulating discs or plates 6 and 7 are fitted closely around each of the contact members 8. Disc 6 may be of a relatively soft material such as rubber, and disc 7 may be of a harder insulating material.

The outer rims of the casing 1 are spun over discs 7 to hold the insulating discs 6 firmly against the flanges 8a of contact members 8 and against shoulders 1c of casing 1 for effectively sealing the rectifiers within casing 1. Flanges 8a of contact members 8 are thereby also held in intimate contact with spring washers 5 which in turn are held in contact with spacers 4, and spacers 4 are held in contact with rectifier elements 3 which are in turn retained in intimate contact with partition 1a of casing 1. Partition 1a conducts heat from rectifier elements 3 to casing 1 for dissipation to the atmosphere.

Fig. 4 shows a circuit arrangement embodying a rectifier assembly shown in Figs. 1, 2 and 3. Primary winding $m$ of a transformer T is energized by current from a suitable source such, for example, as an alternator, having terminals BX and NX. One end of a secondary winding $d$ of transformer T is connected with one of the contact members 8 by a terminal screw which may be inserted in its tapped opening shown, and the other end of secondary winding $d$ is connected with the other contact member 8 by a terminal screw which may be inserted in its tapped opening shown. One terminal of a load L is connected with lug 1b of casing 1, and the other terminal of load L is connected with a mid tap of secondary winding $d$ of transformer T.

Referring now to Figs. 5 and 6, Fig. 5 is an end section view taken at V—V shown in Fig. 6, and Fig. 6 is a side cross section view taken at VI—VI shown in Fig. 5. A hollow metal casing 11 is shown, tubular in shape, which is similar in general to casing 1 shown in Fig. 3. A portion of casing 11 projects inwardly to form a transverse partition 11a. Casing 11 has a shoulder 11b adjacent one of its ends and a shoulder 11c adjacent the other of its ends.

An insulating tube 12 is mounted in a central opening in partition 11a of casing 11.

A bolt 20, having a shoulder 20a is passed through tube 12. Bolt 20 is arranged for riveting at its end which is adjacent shoulder 20a, and is provided with a nut 21 at its other end.

Two rectifier elements 13 are mounted on tube 12 one on either side of partition 11a. A metal spacer element 14 is mounted next to the other side of each of the rectifier elements 13. A connector 15 is mounted on tube 12 between each spacer element 14 and a second rectifier element 16. A metal spacer element 17 and a spring washer 18 are mounted between one of the rectifier elements 16 and shoulder 20a of bolt 20, and a connector 19 as well as a metal spacer 17 and a spring washer 18 are mounted between the other rectifier element 16 and nut 21.

The parts 13, 14, 15, 16, 17, 18 and 19 are clamped together between nut 21 and shoulder 20a of bolt 20, so that each of these parts is in intimate contact with each adjoining part and rectifier elements 13 are in intimate contact with partition 11a. It follows that partition 11a will conduct heat from the the rectifier elements and the other parts mounted on tube 12 to casing 11 for dissipation to the atmosphere.

The rectifiers are hermetically sealed within casing 11 by two insulating discs or washers 22 and 23 having rubber facings 22a and 23a, respectively, one adjacent each end of casing 11. A contact spring 24 and insulating washer 22 are riveted onto the end of bolt 20, with rubber facing 22a of washer 22 sealing against shoulder 20a of bolt 20 and against shoulder 11b of casing 11. The rubber facing 23a of the other insulating washer 23 seals against shoulder 11c of casing 11. The ends of casing 11 are spun over to hold discs 22 and 23 in place.

Three electrical terminals, each of which comprises an eyelet or rivet 26, a terminal post 27, and a terminal screw 28 are mounted on disc 23. Each terminal post 27, provided with a terminal screw 28, is fastened to disc 23 by one of the rivets 26. Each of the rivets 26 is connected by an electrical conductor with one of the connectors 15 or with connector 19. Wire 25, for example, which passes through a hole in partition 11a, connects one of the rivets 26 with the connector 15 which is on the opposite side of partition 11a. An end of each wire 25 is sweated or otherwise sealed into a corresponding rivet 26. The electrical terminals may be enclosed in a protective cap 29 which may be of some suitable material such, for example, as rubber.

Each of the terminal connector wires, such as wire 25, may be passed through a hole in an insulating wire spacer disc 30 for holding the wires in proper positions out of contact with casing 11 and with other parts within casing 11.

Fig. 7 shows a circuit arrangement embodying the rectifier assembly shown in Figs. 5 and 6. A suitable source of alternating current having terminals BX and NX is connected with terminal screws 28 for connectors 15. One side of a load L is connected with terminal screw 28 for connector 19, or it may be connected with contact spring 24, and the other side of load L may be connected in any suitable manner with casing 11.

Although we have herein shown and described only two forms of apparatus embodying our invention, it is understood that various changes and modifications may be made therein within the scope of the appended claims without departing from the spirit and scope of our invention.

Having thus described our invention, what we claim is:

1. A rectifier comprising, a hollow metal casing member a portion of which projects inwardly to form a partition, two rectifier elements mounted in said casing member one on each side of said partition and with one side of each of said rectifier elements contiguous to said partition, two terminal elements one connected with the opposite side of each of said rectifier elements, and means for hermetically sealing said rectifier elements and the adjacent end of each of said terminal elements within said casing member.

2. A rectifier comprising, a hollow metal casing member, a metallic partition within and connected with said casing member, two rectifier elements clamped one contiguous to each side of said partition, terminal means connected with the opposite side of each of said rectifier elements, and means for hermetically sealing said rectifier elements within said casing member.

3. A rectifier comprising, a tubular metal casing member, a transverse partition within and connected with said casing member, two rectifier elements one on each side of and in contact with said partition, means for hermetically sealing said rectifier elements within said casing member, and terminal means extending from each of said rectifier elements through said sealing means.

4. A rectifier comprising, a hollow metal casing member, a metallic partition within and connected with said casing member, two rectifier elements one on each side of and in contact with said partition, insulating plate means for hermetically sealing said rectifier elements within said casing member, and terminal means extending from each of said rectifier elements through said insulating plate means.

5. A rectifier assembly comprising, a tubular metal body a portion of which extends inwardly to form a transverse partition having a central opening through which is passed an insulating tube, two rectifier elements mounted on said tube one on each side of said partition and in intimate contact with said partition, two flanged contact members one fitted over each end of said tube, a metal spacer and a spring washer interposed between the flange of each of said contact members and the nearer rectifier element, and two insulating discs one fitted closely around an extension of each of said contact members for effectively sealing the ends of said tubular metal body.

6. A rectifier assembly comprising, a tubular metal body a portion of which extends inwardly to form a transverse partition having a central opening through which is passed an insulating tube, two rectifier elements mounted on said tube one on each side of said partition and in intimate contact with said partition, two other rectifier elements mounted on said tube one adjacent each of said first two rectifier elements, a metal spacer and a spring washer interposed between each of said first rectifier elements and the adjacent other rectifier element, another metal spacer and another spring washer on the other side of each of said other rectifier elements, a bolt passed through said insulating tube and having a shoulder adjacent one of its ends and a nut adjacent its other end between which said rectifier elements and said spacers and spring washers and said partition are clamped together, an insulating disc fitted closely around said bolt adjacent said shoulder for sealing one end of said tubular metal body, a second insulating disc beyond the opposite end of said bolt for sealing the opposite end of said tubular metal body, and two alternating current terminals mounted on said second insulating disc one of which is connected between the two rectifier elements on one side of said partition and the other of which is connected between the two rectifier elements on the other side of said partition.

7. In a rectifier assembly, the combination comprising, a hollow metal casing member a portion of which projects inwardly to form a partition, two rectifier elements mounted one on each side of said partition in intimate contact with said partition, and means for hermetically sealing said rectifier elements within said casing member.

8. In a rectifier assembly, the combination comprising, a hollow metal casing member, a metallic partition within and connected with said casing member, two rectifier elements one on each side of and in intimate contact with said partition, and means for hermetically sealing said rectifier elements within said casing member.

9. In a rectifier assembly, the combination comprising, a hollow metal casing member, a metallic partition within and connected with said casing member, two rectifier elements mounted one on each side of said partition in intimate contact with said partition, two other rectifier elements mounted one adjacent each of said first rectifier elements with spacer elements between said other rectifier elements and said first rectifier elements and with said spacer elements in intimate contact with said first rectifier elements and with said other rectifier elements, and means for hermetically sealing said rectifier elements within said metal casing member.

ROGER HARRY CUBITT.
RICHARD GEOFFREY SELL.

REFERENCES CITED

The following references are of record in the file of this patent:

UNITED STATES PATENTS

| Number | Name | Date |
|---|---|---|
| 1,144,399 | Turney | June 29, 1915 |
| 2,090,806 | Osawa | Aug. 24, 1937 |
| 2,445,805 | Skinker | July 27, 1948 |
| 2,454,846 | Skinker | Nov. 30, 1948 |